Oct. 11, 1960

E. F. VILTER 2,955,830

COLLET CHUCK

Filed Oct. 20, 1958

INVENTOR
ERNEST F. VILTER

BY
Wright & Wright
ATTORNEYS

Oct. 11, 1960 — E. F. VILTER — 2,955,830
COLLET CHUCK
Filed Oct. 20, 1958 — 2 Sheets-Sheet 2

INVENTOR
ERNEST F. VILTER
BY Wright and Wright
ATTORNEYS

2,955,830
COLLET CHUCK

Ernest F. Vilter, 4161 N. Richards St., Milwaukee, Wis.

Filed Oct. 20, 1958, Ser. No. 768,484

8 Claims. (Cl. 279—58)

This invention appertains to chucks and more particularly to work holding chucks of a type particularly useful in connection with horizontal turret lathes.

In all chucks, with which I am familiar, after the adjustment of the stock or work relative to the operating tool or tools and upon the tightening of the collet by the pulling back thereof, the stock or work is moved back a slight fraction of an inch by said tightening causing an undesirable variation of a certain number of thousandths of an inch from the proper setting of the work or stock.

It is, therefore, one of the primary objects of my invention to provide a novel chuck which will correctly hold the work or stock in its adjusted position without variation upon the closing or tightening of the chuck or its collet.

Another salient object of my invention is the provision of the use of a novel fulcrum washer housed within the chuck body and interposed between a pusher collar for a resilient collet and a fulcrum rib in the chuck body, the inner peripheral edge of the fulcrum washer being engaged by the closer tube, so that upon rearward closing movement of the tube, the washer will be flexed or rcoked on said fulcrum rib to cause forward movement of the pusher collar and the compression of the collet longitudinally in the internally tapered closer ring, and the contraction of the collet circumferentially to cause the same to effectively grip the work or stock without longitudinal movement thereof.

A further important object of my invention is to provide a fulcrum washer for a chuck formed from a plurality of independent rockable segments or an integral flat body weakened to permit its rocking on an annular fulcrum rib when pull is exerted in a desired direction on its inner peripheral edge.

A still further object of my invention is to provide a chuck of the above character which can be utilized on a conventional horizontal turret lathe which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described and claimed, and illustrated in the accompanying drawing, in which drawing, Figure 1 is a longitudinal sectional view through my improved chuck showing the same on the spindle nose of a lathe, and connected with the draw tube of the lathe, the spindle nose and the tube being shown in longitudinal section;

Figure 1:
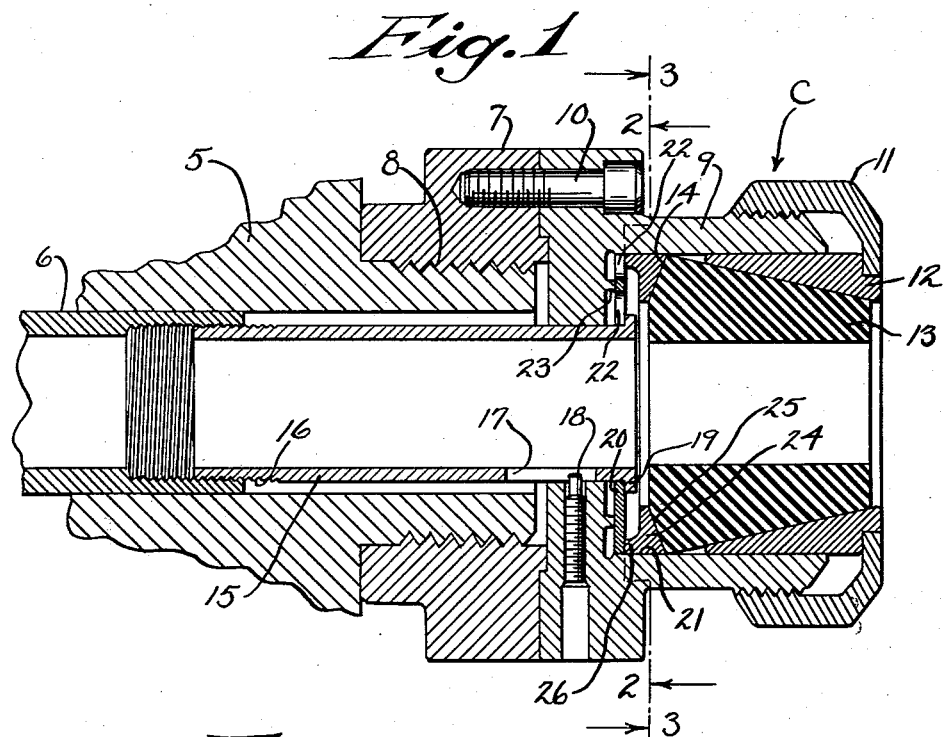

Referring to the drawings in detail, wherein similar reference characters designate corresponding parts throughout the several views, the letter C generally indicates my improved chuck for use in conjunction with a horizontal turret lathe. As the lathe is of conventional construction and forms no part of the present invention, the same has not been illustrated in detail, but the same includes the usual spindle nose 5 and the longitudinal movable closer tube 6.

The chuck C includes an adapter collar 7 which is secured to the spindle nose 5. As illustrated, the spindle nose 5 is provided with external threads 8 for receiving the adapter collar 7. The chuck includes the body 9 and this body is securely fastened to the collar 7, by machine screws 10. The forward end of the chuck body 9 carries the adjusting nut 11 which bears against the internally tapered closer ring 12. This closer ring may or may not be split. The closer ring 12 snugly receives an externally tapered resilient collet 13. The collet 13 can be formed from rubber or some material capable of being compressed longitudinally and contractable circumferentially. The collet is preferably of the well-known "Jacobs" type, i.e., formed from a plurality of rubber segments and staggeredly arranged radial plates. The collet extends slightly inward of the closer ring and its inner face is provided with a tapered seat 14, for a purpose, which will later appear.

The chuck body 9 is provided with an internal annular enlargement for snugly and slidably receiving the sleeve 15 which forms a continuation of the draw tube 6. The inner end of the sleeve 15 can be externally threaded, as at 16, for connection with the tube 6, so that the sleeve and tube will move as a unit. In order to prevent turning movement of the sleeve 15, the same is provided with a key slot 17 and a set screw 18 is threaded into the chuck body 9 and into the key slot. The extreme forward end of the draw sleeve 15 is provided with a radially extending annular flange 19 for operative connection with a fulcrum washer 20.

The fulcrum washer 20 forms an important part of this invention, and the same is fitted within the chuck body 9 inward of the resilient collet 13. The inner surface of the chuck body 9 forward of the annular internal enlargement is provided with a smooth bearing face for the washer and for the closer ring 12. This washer can be formed, as shown, from flat stock, preferably of a resilient nature and to facilitate the flexing thereof, for a purpose which will later appear, the same is provided with radially extending slots 22. The slots extend inward from both the inner and outer peripheral edges of the fulcrum washer.

Formed on the forward face of the internal annular enlargement of the chuck body 9 is an annular fulcrum rib 23 and the fulcrum washer rests against this rib at a point substantially equidistant between its inner and outer peripheral edges.

Figure 2:
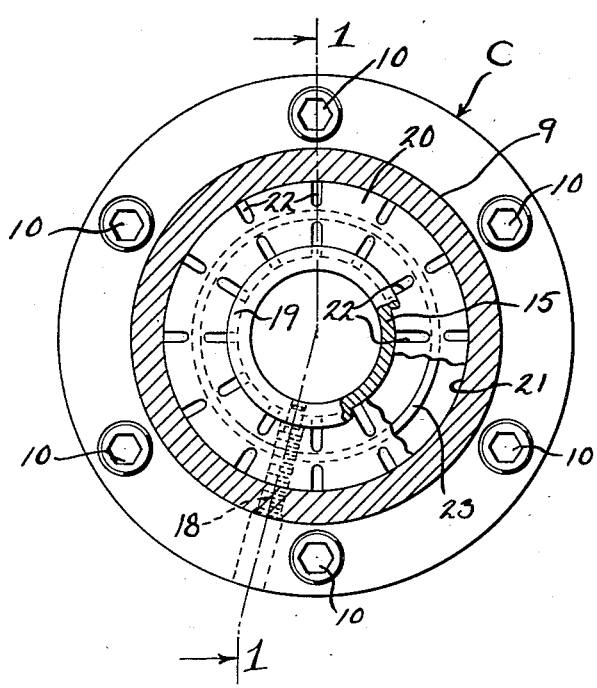
Figure 2 is a transverse sectional view through the chuck taken on the line 2—2 of Figure 1, looking in the direction of the arrows and showing more particularly one preferred form of the fulcrum washer.
Figure 3:
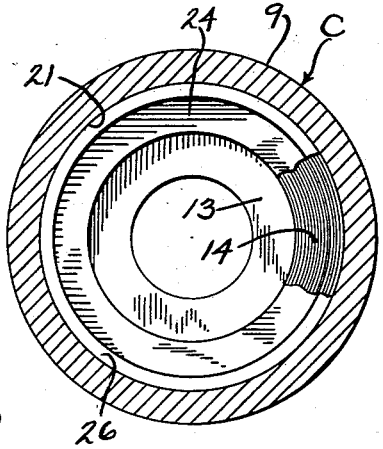
Figure 3 is a transverse sectional view through the chuck taken on the line 3—3 of Figure 1, looking in the direction of the arrows and illustrating more particularly the pusher collar.

As best shown in Figures 1 and 2, the annular flange 19 on the pusher sleeve 15 engages the front face of the fulcrum washer adjacent to its inner peripheral edge. The fulcrum washer adjacent to its outer peripheral edge engages an annular pusher collar 24. The forward face of the pusher collar is preferably tapered inwardly, as at 25, and fits snugly against the seat 14 formed on the resilient collet 13. The inner face of the pusher collar 24 is provided with an annular flange 26 and the fulcrum washer bears against this flange.

In operation, the lathe is utilized in the normal way and the stock is fitted within the collet 13 and may or may not extend into the draw tube 6 and sleeve 15. The stock is adjusted within the collet to the correct desired position relative to the operating tool (not shown), and initially held by the adjusting nut 11. After proper adjustment of the stock, the draw tube 6 is pulled back carrying the sleeve 15 therewith. The flange 19 of the sleeve 15 engaging the peripheral edge of the fulcrum washer 20 pulls back on the washer rocking the washer on the fulcrum rib 23. This exerts a forward movement on the fulcrum washer at its outer peripheral edge causing a desired forward movement of the pusher collar 24. As the resilient collet 13 is confined within the internally tapered closer ring 12 the collet will be compressed longitudinally and hence will contract circumferentially into tight gripping contact with the stock. Hence, it can be seen that the collet in contradistinction to being pulled rearwardly, is pushed forwardly into the tapered closer ring.

While I have shown the fulcrum washer formed from flat stock and weakened by radial slots to permit the flexing thereof during its rocking movement, it is to be understood that the washer can be formed in different manners without departing from the invention, and obviously, the washer could be formed from a plurality of independent segments rockable on the fulcrum rib 23.

Figure 4:
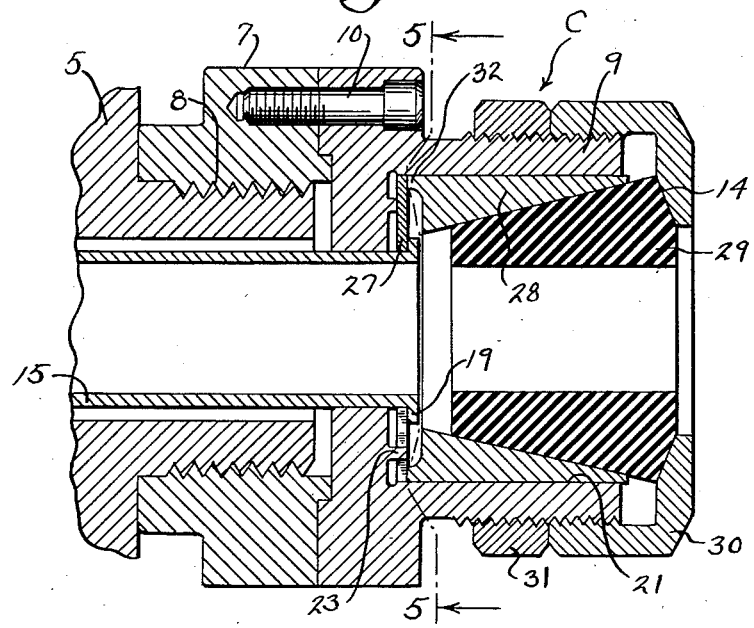
Figure 4 is a view similar to Figure 1 but showing a slightly modified form of my invention, the section being taken on the line 4—4 of Figure 5, looking in the direction of the arrows.
Figure 5:
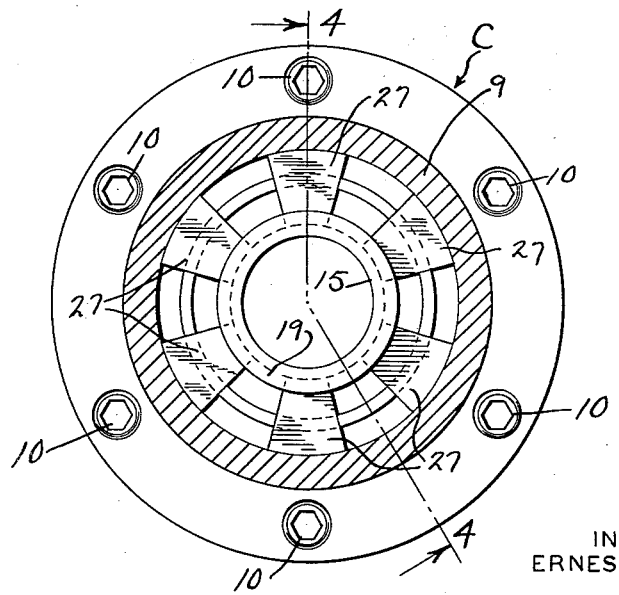
Figure 5 is a transverse sectional view through the modified form of the chuck taken on the line 5—5 of Figure 4, looking in the direction of the arrows.

Thus, in Figures 4 and 5, I have shown the washer formed from a plurality of independent segments which function in the nature of rockable levers. Referring more particularly to Figures 4 and 5, it will be noted that the segments are indicated by the reference character 27 and that these segments are spaced one from the other. If preferred, however, the segments 27 can be arranged in a continuous annular row. The segments are rockably mounted intermediate their inner and outer terminals on the fulcrum rib 23 and the fulcrum rib can be notched to receive the segments so that the segments will be held against circumferential movement. In this form of the invention, I employ a pusher collar 28 which is in the nature of a closer ring and hence the pusher collar 28 is internally tapered and the taper extends outwardly toward the forward end of this pusher collar. The pusher collar snugly receives the resilient collet 29. The collet 29 is of the same type as the collet 13 shown in the first form of the invention. However, the collet 29 is in a reversed position from that shown in Figure 1. The collet can be held in place and initially adjusted by a nut 30. The nut 30 can be held in its adjusted position by a lock nut 31.

In this form of my invention, when the draw sleeve 15 is pulled rearwardly, its flange 19 will pull back on the inner edges of the segments 27, causing the rocking of the segments on the fulcrum rib 24 and the forward pushing of the collar 28. Due to the taper of the collet 29 and the collar 28, the collet 29 will be contracted tight against the work. It is to be noted that the pusher collar 28 has formed on its rear end and at its outer surface, an annular flange 32 against which the segments 27 bear.

Various changes in details may be made without departing from the spirit or the scope of this invention, but what I claim as new is:

1. A chuck comprising a chuck body having an internal annular enlargement, a closer tube slidable in said annular enlargement having an annular outwardly projecting flange, a resilient collet received within said body forward of the annular enlargement, an internally tapered closer ring received within the body and snugly receiving the collet, an adjusting nut threaded on said body for said closer ring, a pusher collar slidable in the body between the annular enlargement thereof and said collet, and a fulcrum washer rockable in said body engaging the pusher collar adjacent to its outer peripheral edge, and said flange engaging the fulcrum washer adjacent to its inner peripheral edge, whereby upon inward sliding movement of the closer tube the washer will be rocked intermediate its inner and outer peripheral edges to force the pusher collar against the resilient collet.

2. A chuck for holding stock on the spindles of lathes comprising a body for connection with a lathe spindle and said body having an internal annular enlargement forming a guide, a closer tube slidably mounted in the guide having at its forward end an annular outstanding flange, a closer ring slidably mounted in the body having an internally tapered seat, a resilient collet received within said seat and said body, an adjusting nut threaded on the body and engaging said closer ring for adjusting said closer ring in the body, said body having an annular fulcrum rib on the forward face of the annular enlargement, a pusher collar slidable in said body and engaging the rear face of the resilient collet, and a fulcrum washer in said body interposed between the pusher collar and the annular enlargement seated on said annular fulcrum rib at a point intermediate its inner and outer periphery, said washer engaging the pusher collar adjacent to its outer periphery, and said flange engaging the front face of the washer adjacent to its inner periphery, whereby upon rearward movement of the closer tube, the fulcrum washer will be rocked on the fulcrum rib to cause forward movement of the washer at its outer peripheral edge to force said pusher collar into compressing engagement with the resilient collet.

3. A chuck for holding stock on the spindles of lathes, as defined in claim 2, and said washer being weakened to permit the rocking thereof on said rib.

4. A chuck for holding stock on the spindles of lathes, as defined in claim 2, and the inner face of said collet being provided with an outwardly tapered seat to receive said pusher collar.

5. In a lathe including a spindle and a sliding closer tube in said spindle, of a chuck for holding stock including a body, an adapter collar carried by said body and secured to the spindle, said body having at its inner end an internal annular enlargement forming a guide, a draw sleeve secured to said tube for movement therewith having at its forward end an outwardly extending annular flange, an annular fulcrum rib on the forward face of said annular enlargement, a resilient collet received within the body forward of the enlargement and said collet being externally tapered, an internally tapered closer ring slidably received within the body and over said collet, an adjusting nut for said ring threaded on the body, a pusher collar slidable in the body engaging the rear face of said collet, said collar having a rearwardly extending annular shoulder at its outer edge, and a fulcrum washer seated on said fulcrum rib at a point intermediate its inner and outer periphery, said washer engaging said shoulder adjacent to its outer periphery and the flange of said sleeve engaging the forward face of the washer at its inner periphery, whereby upon rearward movement of the tube and sleeve the washer will be rocked on said fulcrum rib to cause forward movement of the pusher collar and the longitudinal compression of the collet and the circumferential contraction thereof.

6. A chuck for holding stock on the spindles of lathes comprising a body for connection with a lathe spindle and said body having an internal annular enlargement forming a guide, a closer tube slidably mounted in the guide having at its forward end an annular outstanding flange, a resilient collet received within the body, an adjusting member on the body for initially adjusting the resilient collet, a pusher collar slidable in the body and engaging the collet in rear of the initial adjusting member, and means rockably mounted in the body engaging the pusher collar adjacent to its outer edge, and said flange on the closer tube engaging the inner edge of said means whereby upon rearward movement of the closer tube said means will be rocked to cause forward movement of the pusher collar and the contraction of the resilient collet.

7. A chuck for holding stock on the spindles of lathes comprising a body for connection with a lathe spindle and said body having an internal annular enlargement forming a guide, a closer tube slidably mounted in the guide having at its forward end an annular outstanding flange, a fulcrum rib on the forward face of said enlargement, a collet received within said body, means on said body for initially adjusting the collet in the body, a pusher collar slidable in the body engaging the collet, and means rockable on the fulcrum rib engaging adjacent to its outer edge the pusher collar, and said flange engaging said rockable means adjacent to its inner edge, whereby upon rearward movement of the closer tube said last named means will be rocked on the fulcrum rib to cause forward movement of the pusher collar and the contraction of the collet.

8. A chuck for holding stock on the spindles of lathes comprising a body for connection with a lathe spindle and said body having an internal annular enlargement forming a guide, a closer tube slidably mounted in the guide having at its forward end an annular outstanding flange, a resilient collet received within said body, an adjusting member on said body for initially adjusting the collet within the body, a pusher collar slidably mounted in the body in rear of said member and engaging said collet, a fulcrum rib on the forward face of the enlargement, and members rockably mounted intermediate their inner and outer ends on said fulcrum rib, the outer ends of said member engaging the pusher collar, and said annular flange engaging the inner ends of said members whereby upon rearward movement of the closer tube, said members will be rocked on the fulcrum rib to cause forward movement of the pusher collar and the contraction of the collet.

References Cited in the file of this patent

UNITED STATES PATENTS

| | | |
|---|---|---|
| 442,230 | Libby | Dec. 9, 1890 |
| 2,844,377 | Hull | July 22, 1958 |